United States Patent

Kramer, Sr.

[11] 3,975,129
[45] Aug. 17, 1976

[54] APPARATUS FOR MAKING FLEXIBLE CORRUGATED TUBING

[76] Inventor: Vance M. Kramer, Sr., 402 E. Boundry Road, Perrysburg, Ohio 43551

[22] Filed: Aug. 16, 1974

[21] Appl. No.: 497,843

[52] U.S. Cl. .............................. 425/387 B; 425/392; 425/397
[51] Int. Cl.² ..................... B29D 23/03; B29C 17/04
[58] Field of Search .......... 425/369, 387, 392, 396, 425/393, 397, 389

[56] References Cited
UNITED STATES PATENTS

| | | | |
|---|---|---|---|
| 1,963,013 | 6/1934 | Breth | 425/393 |
| 2,306,018 | 12/1942 | Fentress | 72/307 |
| 3,076,228 | 2/1963 | Johnson | 425/324 |
| 3,304,581 | 2/1967 | Kramer et al. | 425/396 |
| 3,371,381 | 3/1968 | Louth | 425/387 |
| 3,669,586 | 6/1972 | Kramer | 425/387 |
| 3,672,804 | 6/1972 | Dalik | 425/393 |
| 3,705,780 | 12/1972 | Kramer et al. | 425/392 |

FOREIGN PATENTS OR APPLICATIONS

| | | | |
|---|---|---|---|
| 1,479,213 | 2/1969 | Germany | 425/392 |

Primary Examiner—Francis S. Husar
Assistant Examiner—Carl Rowold
Attorney, Agent, or Firm—Bosworth, Sessions & McCoy

[57] ABSTRACT

Apparatus for making flexible corrugated tubing of relatively large diameter and wall thickness from an extruded sleeve of uncured vulcanizable stock. The sleeve is placed on a cylindrical forming mandrel and radially expanded into an axially extensible and compressible forming member having interior edges that define successive convolutions coaxial with the mandrel and which form creases in the sleeve when it is radially expanded. The mandrel is supported at its opposite ends by two spaced forming head assemblies that surround the ends of the sleeve and which also engage the opposite ends of the forming member. When the sleeve is radially expanded to form bulges between the interior edges, the forming head assemblies are simultaneously moved in an axial direction toward one another by power means to compress the forming member and sleeve and thus, to produce embryonic corrugations in the sleeve. After the forming head assemblies are moved apart to their initial position, the forming member is removed from the mandrel and sleeve and the resulting product is cured in the desired corrugated form.

10 Claims, 10 Drawing Figures

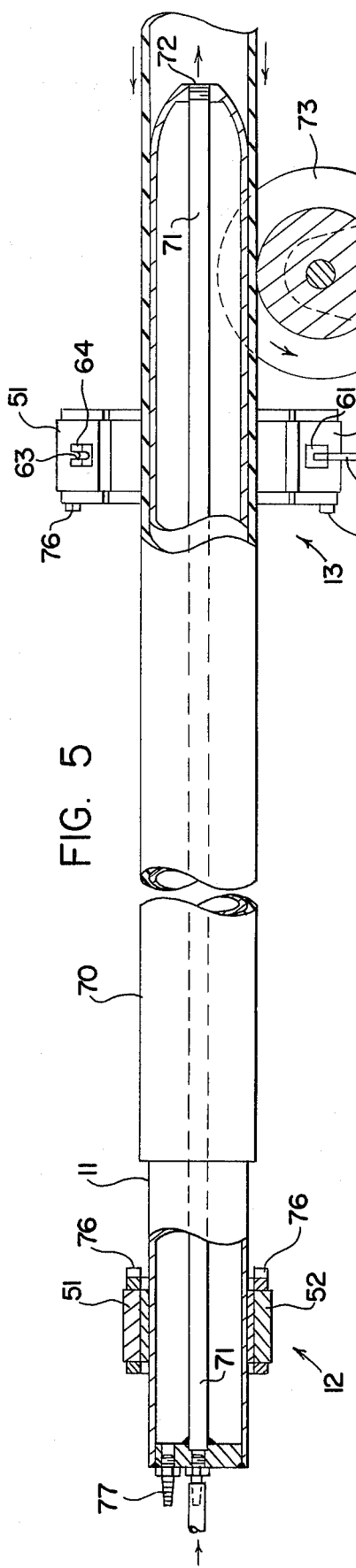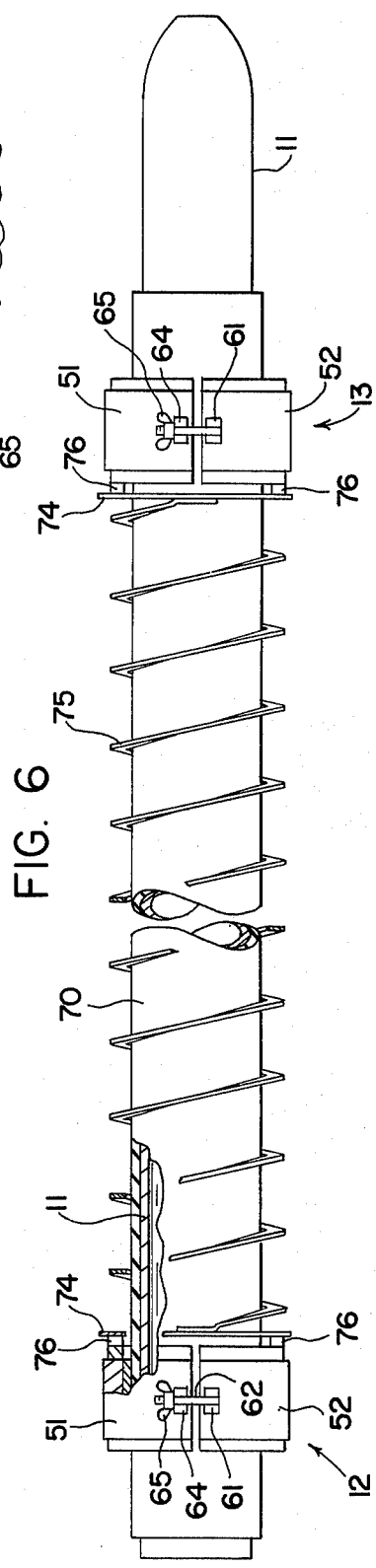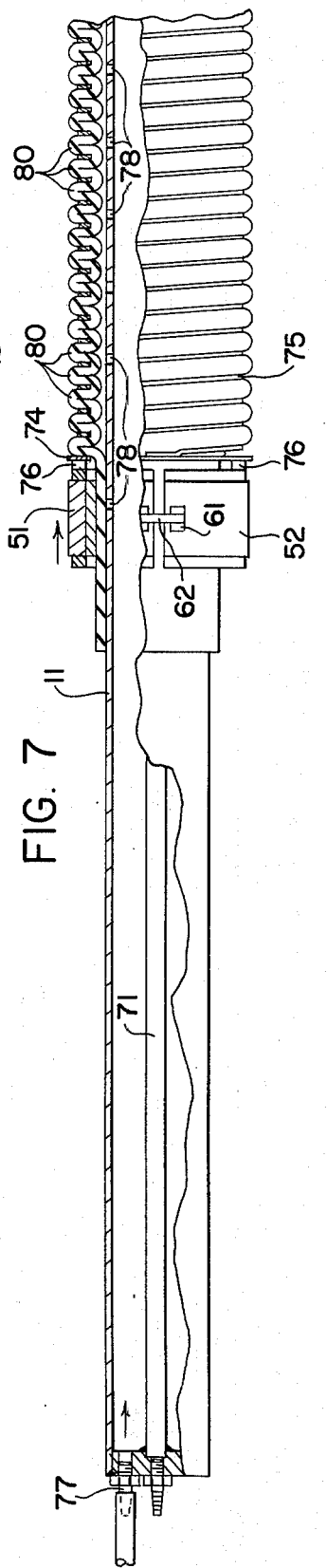

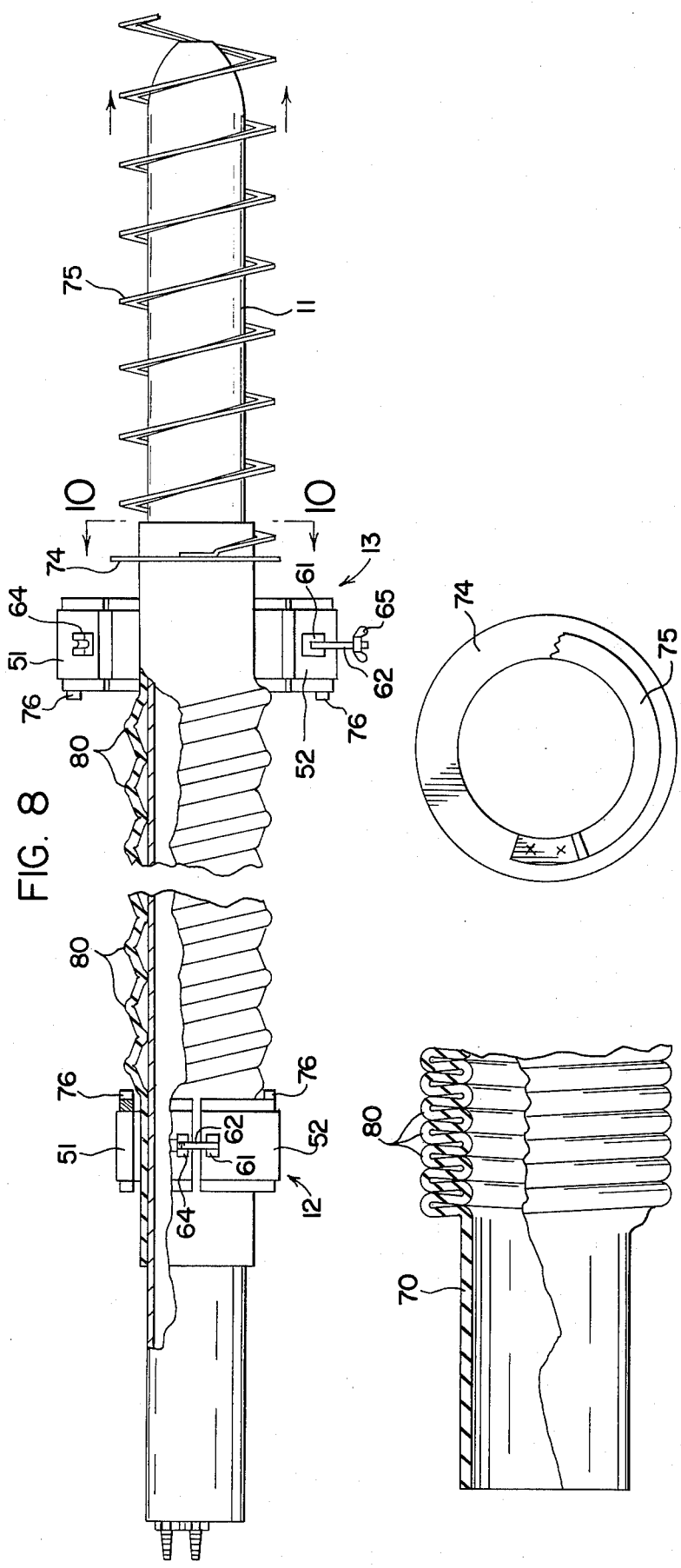

APPARATUS FOR MAKING FLEXIBLE CORRUGATED TUBING

BACKGROUND OF THE INVENTION

This invention relates to the manufacture of corrugated rubber tubing of relatively large diameter and wall thickness and, more particularly, to power driven apparatus for fabricating such tubing.

More particularly, the invention relates to an apparatus for making such corrugated tubing from sleeves of relatively large diameter and wall thickness such that the forces necessary for forming embryonic corrugations in the uncured rubber prior to curing are too great to be obtained by human strength as required in accordance with the teachings of U.S. Pat. Nos. 3,168,604 and 3,304,581.

As disclosed in U.S. Pat. Nos. 3,168,604; 3,304,581 and 3,669,586, corrugated tubing with annular or helical corrugations may be made with forming devices including axially spaced annular discs or helical convolutions that are employed with forming mandrels to produce embryonic corrugations in uncured rubber sleeves. Each time a tube is formed, the forming member is placed over the forming mandrel, on which the sleeve has been positioned, and the sleeve is radially expanded so that it bulges into the spaces between the discs or helical convolutions, forming creases between the bulges. According to the aforesaid patents, the forming member and sleeve are then collapsed axially so that the sleeve is axially compressed, concertina fashion. The creases together with adjacent bulges provide embryonic corrugations. Then the forming member is axially extended together with the sleeve after which the sleeve is removed from the forming mandrel and placed on a cylindrical curing mandrel where it is axially foreshortened, concertina fashion, into corrugated form with the desired spacing between adjacent annular or helical corrugations.

For some uses, it is desirable to provide flexible corrugated tubing of relatively large diameter and wall thickness. For example, such tubing is particularly useful for exhausting noxious gases from vehicle engines at garages where automotive service is performed. Tubing for this purpose should have an interior passage diameter of from 2½ to 6 inches or more. Because of the high temperature of the exhaust gases which pass through the tubing, it is necessary that certain special vulcanizable compounds be used so that the resulting product has a high thermal resistance.

Because of the relatively large wall thickness of the extruded sleeves used to make the tubing, the manual process formerly used (for example, the process of U.S. Pat. No. 3,168,604) may not be employed because the forces required to perform the step of axially collapsing the forming member and sleeve to compress the sleeve concertina fashion and form the embryonic corrugations, are too great to be generated with human strength. The largest corrugated tubing that it has been possible to make under the aforesaid manual process has been 11 ft. long with an inner diameter of 2 inches and a wall thickness of 3/32 inches.

While it is possible to make large diameter tubing with helical corrugations using the cording method disclosed in U.S. Pat. No. 2,832,096, this method cannot be used to achieve high production rates. Furthermore, the length of corrugated tubes that can be made using the cording method is limited to about 12 ft. Forming mandrels longer than 12 ft. bend too easily and a whipping action occurs that disrupts the cording process. Also, where high temperature resistant compounds are used the cording method is impractical because of problems encountered in curing the sleeve with the cord wrapped thereon.

The method and apparatus of the present invention make possible the manufacture of large diameter tubing (e.g., with an inner diameter of between 2½ to 6 inches or more) using the method of U.S. Pat. No. 3,168,604, by providing a novel means for generating the necessary forces to compress the sleeve of uncured vulcanizable material concertina fashion to form embryonic corrugations. Corrugated tubing lengths up to 23 ft. or more may be produced in this manner. The invention also affords other features and advantages heretofore and not obtainable.

SUMMARY OF THE INVENTION

It is among the objects of the invention to produce flexible rubber tubing of relatively large diameter and wall thickness with axially spaced annular or helical corrugations.

These and other objects and advantages are achieved with the novel apparatus of the invention which comprises a cylindrical mandrel adapted to receive a sleeve of uncured vulcanizable material, an elongated axially extensible forming member adapted to be positioned over the mandrel and sleeve, the forming member being provided with interior forming edges that comprise successive convolutions coaxial with the mandrel. When the sleeve is radially expanded by air pressure received through the wall of the mandrel, bulges are formed in the annular spaces between the convolutions. A pair of spaced apart, power driven forming head assemblies that support the mandrel while gripping opposite ends of the sleeve around the mandrel and engaging opposite ends of the forming member, are driven toward one another to compress the forming member and the radially expanded sleeve concertina fashion to form embryonic corrugations.

BRIEF DESCRIPTION OF THE DRAWINGS

FIG. 5 is a broken elevational view, partly in section illustrating the initial step in the operation of the apparatus of the invention wherein an extruded sleeve of uncured vulcanizable material is loaded onto a forming mandrel;

FIG. 6 is a broken elevational view partly in section, illustrating a subsequent step in the operation of the apparatus;

FIG. 7 is a fragmentary elevational view partly in section illustrating another subsequent step in the operation of the apparatus of the invention;

FIG. 8 is a broken elevational view partly in section illustrating the removal of the forming member from the apparatus of the invention;

FIG. 9 is a fragmentary elevational view with parts broken away and shown in section, illustrating an extruded sleeve with embryonic corrugations formed therein by the operation of the apparatus as illustrated sequentially in FIGS. 5 through 8; and FIG. 10 is a sectional view taken on the line 10—10 of FIG. 9.

DESCRIPTION OF THE PREFERRED EMBODIMENT

Referring more particularly to the drawings and initially to FIGS. 1 through 4, there is shown an apparatus 10 for forming embryonic corrugations in an extruded sleeve of vulcanizable material prior to curing. The apparatus includes a tubular forming mandrel 11 adapted to receive the extruded sleeve thereon and two forming head assemblies 12 and 13 adapted to support the mandrel 11 at its ends and to engage the ends of the extruded sleeve positioned on the mandrel 11. Also the forming head assemblies are adapted to move toward and away from one another between an open position shown in solid lines in FIGS. 1 and 2, and a closed position shown in dashed lines in FIGS. 1 and 2.

Figure 1:
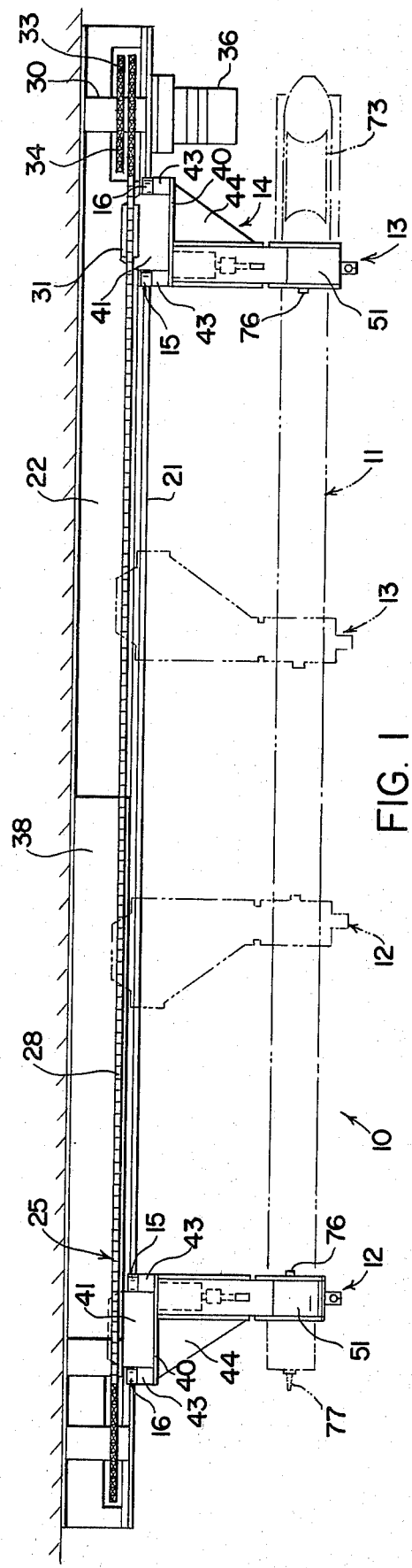
FIG. 1 is a plan view of an apparatus embodying the invention and showing the forming head assemblies in their extended spaced apart position in solid lines and in their inward closely spaced position in dashed lines.
Figure 2:
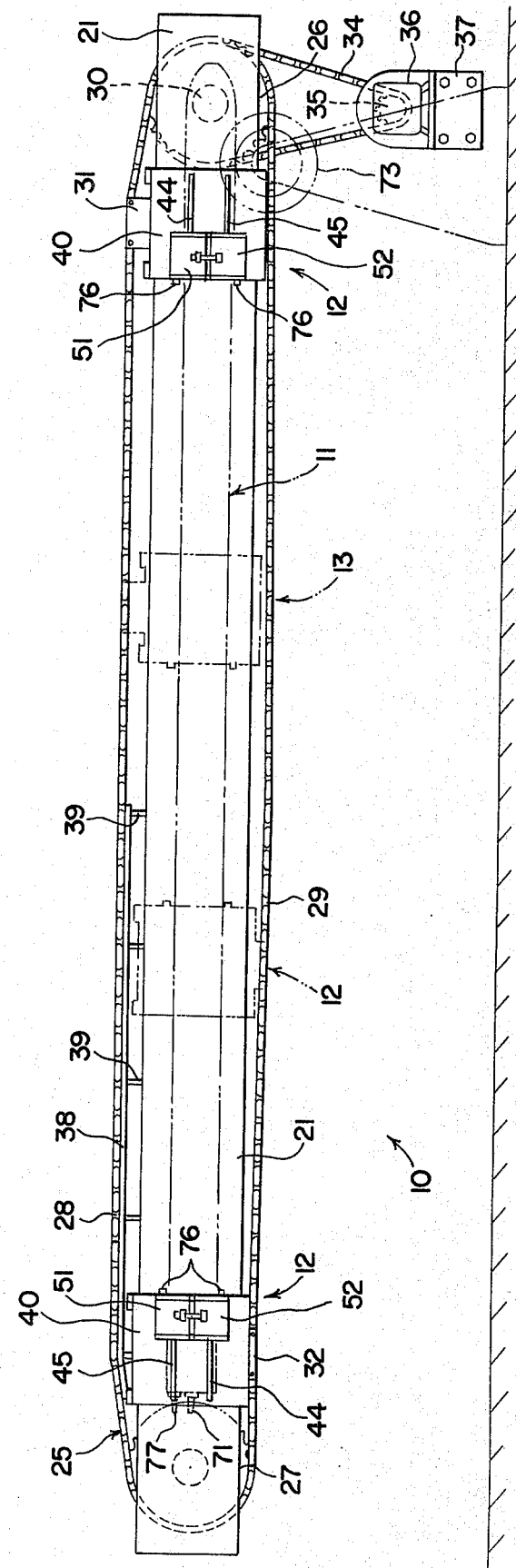
FIG. 2 is an elevational view of the apparatus of FIG. 1 again illustrating the forming head assemblies in their spaced apart initial position in solid lines and in their more closely spaced position in dashed lines.
Figure 3:
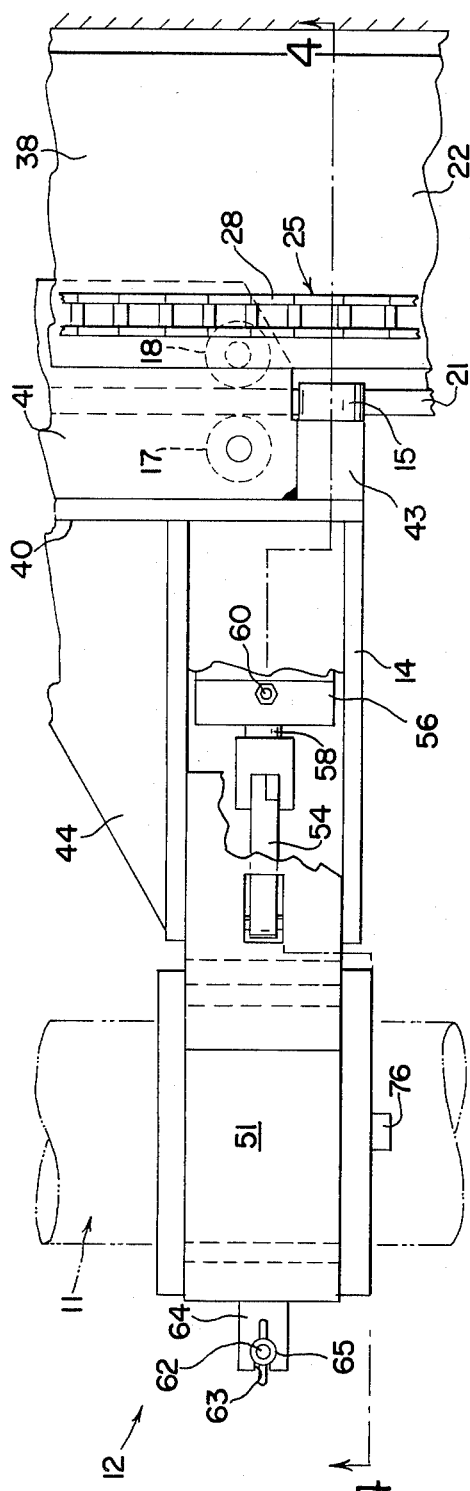
FIG. 3 is a fragmentary plan view on an enlarged scale of one of the forming head assemblies of FIGS. 1 and 2.
Figure 4:
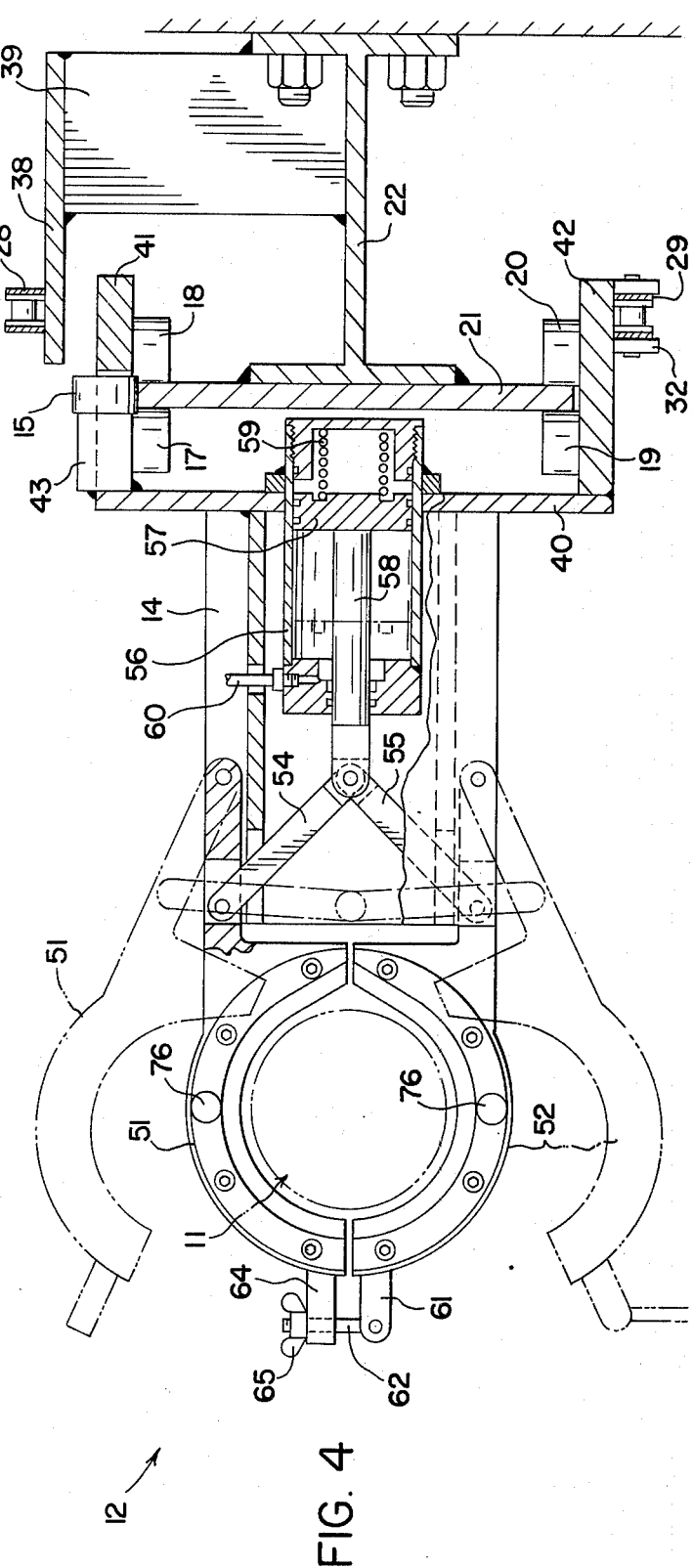
FIG. 4 is a fragmentary sectional view on an enlarged scale taken on the line 4—4 of FIG. 3 and showing the clamping jaws in their closed position in solid lines and in their open position in dashed lines.

Referring to FIGS. 3 and 4, the forming head assemblies 12 and 13 each comprise a carriage 14 that is supported and guided for travel on rollers including two horizontal axis rollers 15 and 16, two pairs of upper vertical axis rollers, each pair including an outer roller 17 and an inner roller 18, and two pairs of lower vertical axis rollers, each pair including an outer roller 19 and an inner roller 20.

The rollers 15, 16, 17, 18, 19 and 20 engage a guide rail 21 welded to the flange of a steel "I" beam 22 that is bolted to an upright wall. The horizontal axis rollers 15 and 16 engage the top edge of the guide rail 21, the upper vertical axis rollers 17 and 18 engage opposite sides of the top margin of the vertical faces of the guide rail 21 and the lower vertical axis rollers 19 and 20 engage the lower marginal portion of the vertical faces of the guide rail 21.

The carriages 14 are moved toward and away from one another from the open or initial position to the inward or closed position by means of a roller chain 25 that extends between a drive sprocket 26 and an idler sprocket 27. The chain 25 has an upper span 28 and a lower span 29, the upper span 28 being connected by a bracket 31 to the right hand forming head assembly 13 and the lower span 29 being connected by a bracket 32 to the left hand forming head assembly 12. Accordingly, as the upper span 28 travels to the left as viewed in FIGS. 1 and 2 and the lower span 29 correspondingly travels to the right, the forming head assemblies 12 and 13 are moved simultaneously and at the same speed toward one another. When the chain 25 travels in the opposite direction the upper and lower spans 28, 29 carry the forming head assemblies 12 and 13 respectively, away from one another back to the original position illustrated in solid lines in FIGS. 1 and 2.

The drive sprocket 26 is mounted on a shaft 30 together with another identical parallel sprocket 33. The sprocket 33 is turned by a drive chain 34 driven by the output sprocket 35 of a drive motor 36 mounted on a bracket 37 bolted to the wall.

A horizontal guide plate 38 is welded to a plurality of uniformly spaced web plates 39 to support the roller chain upper span 28 at the left hand end of the apparatus. This prevents the upper span 28 of the chain 25 from interfering with the travel of the forming head assembly 12.

The construction and operation of the forming head assemblies 12 and 13 will be described only with respect to the forming head assembly 12 best illustrated in FIGS. 3 and 4. The carriage 14 comprises a vertical carriage plate 40 with upper and lower flange plates 41 and 42 respectively, welded thereto and which provide a journal mount for the vertical axis rollers 17, 18, 19 and 20. Bearing blocks 43 welded to the carriage plate 40 serve as mounts for the horizontal axis rollers 15 and 16.

A pair of triangular parallel web plates 44 and 45 are welded to the opposite side of the carriage plate 40. The plates 44 and 45 support upper and lower clamping jaws 51 and 52 respectively, the upper clamping jaw 51 being pivotally connected to the web plate 44 and the lower clamping jaw 52 being pivotally connected to the web plate 45. The jaws are adapted to grip therebetween the sleeve positioned on the mandrel and are pivotal between the closed position illustrated in solid lines in FIG. 4 and an open position illustrated in dashed lines in FIG. 4 by upper and lower toggle links 54 and 55 respectively. The toggle links 54 and 55 are operated by an air cylinder 56 with a reciprocating piston 57. A piston rod 58 extending from the piston 57 is pivotally connected to both of the toggle links 54 and 55.

The piston 57 is biased toward the jaw open position by a helical spring 59. Air pressure supplied through the air line 60 forces the piston 57 to the retracted position which in turn operates the toggle links 54 and 55 to bring the jaws 51 and 52 to their closed position. In order to secure the jaws in the closed position, the lower jaw 52 is provided with a hinge fork 61 which pivotally supports a threaded stud 62. The stud 62 may be pivoted upward into a slot 63 in a bracket 64 on the upper jaw 51 and the two jaws secured together by a wing nut 65 which is tightened down on the threaded stud 62 as illustrated in FIG. 4.

Operation

As indicated above, the forming head assemblies 12 and 13 are movable toward and away from one another by the roller chain 25 to accomplish the forming of embryonic corrugations in the sleeve of uncured rubber. The operation of the apparatus 10 thus described is illustrated in FIGS. 5 through 10.

Referring first to FIG. 5, there is shown an extruded sleeve 70 of uncured vulcanizable material being slid over the forming mandrel 11. The loading operation is facilitated by means of air pressure supplied through a central air line 71 extending axially through the mandrel 11 and emitting pressurized air through an axial port 72 at the right hand end of the forming mandrel 11. During the loading operation, an operator slides the sleeve 70 along in increments and then breaks the sleeve at a right angle to form a seal and keep a portion of the sleeve inflated to facilitate sliding movement over the mandrel 11. The sleeve 70 is moved to the left with its left hand end portion being slid between the jaws 51 and 52 of the left hand forming head assembly 12. Loading is also facilitated by a relatively large roller wheel 73 which is positioned at the loading end of the mandrel 11.

After the sleeve 70 is properly positioned, a spring-like helical forming member 75 with annular flanges at each end is slid over the sleeve (FIG. 6) and the flanges 74 at each end are placed against magnets 76 located on the inner faces of the upper and lower clamping jaws 51 and 52 of each forming head assembly 12 and 13. The jaws 51 and 52 are then closed and clamped together using the studs 62 and wing nuts 65. In this position, the helices of the spring-like forming member 75 are uniformly spaced apart to define interior edge portions in a desired pattern for making the embryonic corrugations.

With the sleeve 70 and forming member 75 in this position, air under pressure is applied through a second air pressure line 77 to the interior of the mandrel 11, the pressure being applied through ports 78 in the wall of the mandrel 11.

The resulting air pressure is transmitted to the interior surface of the sleeve 70 and causes the sleeve to bulge radially outward into the spaces between the helices of the forming member 75. With the sleeve thus radially expanded, the drive motor 36 is operated to drive the roller chain 25 and move the forming head assemblies 12 and 13 toward one another to compress the forming member 75 and the bulges 80 between the helices thereof. The terminal portion of this procedure is illustrated in FIG. 7 wherein it will be seen that the bulges 80 have been compressed between the helices of the forming member 75 to form embryonic corrugations in the sleeve 70.

The drive motor 36 is then operated in the reverse direction to move the forming head assemblies 12 and 13 apart and back to the original position to again extend both the sleeve 70 with embryonic corrugations therein, and the forming member 75. When the sleeve has been axially extended to this condition, the forming member 75 may be removed as illustrated in FIG. 8.

The forming member 75 is removed by opening the jaws 51, 52 of the forming head assembly 13 and sliding the forming member to the right off of the sleeve 70. Then the left hand forming head assembly 12 is opened using the respective air cylinder 56 so that the mandrel 11 and sleeve 70 are held in a loosely supported condition. An operator then manually slides the sleeve 70 to the right, off of the forming mandrel 11 and, in most instances, onto a curing mandrel (not shown) axially aligned with the forming mandrel 11. When the sleeve 70 is on the curing mandrel, it is manually compressed concertina fashion to provide corrugations of the desired spacing. As indicated in FIG. 9, the corrugations may be very tightly spaced or if desired, more loosely spaced depending upon the type of product desired.

Usually in the practice of the invention, the forming mandrel 11 is sprayed with a lubricant to facilitate loading and unloading of the sleeve 70. It will be apparent that longer lengths may be handled as desired by changing the spacing between the forming head assemblies 12 and 13 and utilizing a longer forming mandrel 11. With a forming mandrel 40 ft. long, for example, corrugated tubes of up to 23 ft. in length can be produced. In the apparatus shown, the spacing between the forming head assemblies 12 and 13 at their initial spaced apart position can be adjusted merely by changing their point of attachment to the roller chain 25. In some instances where long mandrels are used, it may be desirable to support the mandrel at its center by connecting a supporting means to the forming member, for example. The center connection does not interfere with the collapsing of the forming member and sleeve.

It will also be apparent that tubing with annular corrugations can be made utilizing the apparatus of the invention merely by using a forming member of the type shown in U.S. Pat. No. 3,669,586 wherein annular discs are used to form the bulges, the discs being interconnected at their outer peripheral margins by short helical elements or other comparable structure. Corrugated tubing with an inner diameter of from 2½ to 6 inches may be produced in accordance with the invention and, in fact, with an inner diameter of up to 8 inches, if desired.

While the invention has been shown and described with respect to specific embodiments thereof, this is intended for the purpose of illustration rather than limitation and other modifications and variations in the specific device herein shown and described will be apparent to those skilled in the art all within the intended spirit and scope of the invention. Accordingly, the patent is not to be limited in scope and affect to the specific form illustrated and described herein nor in any other way that is inconsistent with the extent to which the progress in the art has been advanced by the invention.

I claim:

1. Apparatus for forming lengths of flexible corrugated tubing from sleeves of uncured vulcanizable material comprising
   a mandrel adapted to receive a sleeve of uncured vulcanizable material thereover, an elongated, unitary, axially extensible forming member removably positioned over said mandrel and sleeve to define when extended convolutions having continuous inner edges uniformly spaced along said sleeve,
   means operatively associated with said mandrel for supplying air under pressure to the interior of said sleeve for radially expanding said sleeve to cause portions thereof to buldge into the spaces between said convolutions,
   power means engageable with opposite ends of said forming member of said sleeve for axially collapsing said forming member and said expanded sleeve to compress said buldges and for thereafter axially extending said forming member and sleeve to radially reduce said bulges,
   means associated with said power means whereby said forming member may be removed from said sleeve by movement in an axial direction, and said sleeve may be removed from said mandrel by movement in an axial direction,
   said power means also comprising means for supporting said mandrel in said apparatus and permitting removal of said forming member and said sleeve from said mandrel while said mandrel is supported in said apparatus.

2. Apparatus as defined in claim 1 wherein said power means comprises a pair of spaced forming head assemblies supported for movement in a path parallel to said mandrel and adapted to surround and support said mandrel and means disposed for moving said head assemblies simultaneously in opposite directions axially along said mandrel between an initial widely spaced position and a fully compressed closely spaced position.

3. Apparatus as defined in claim 2 including an endless roller chain carried between two horizontal axis sprockets for driving said forming head assemblies, said chain having two parallel spans moving in opposite directions, one of said forming head assemblies being connected to one of said spans and the other of said forming head assemblies being connected to the other of said spans, and a drive motor for driving at least one of said sprockets whereby said forming head assemblies are moved by said chain toward and away from one another.

4. Apparatus as defined in claim 2 including means defining a way parallel to said mandrel and wherein each of said forming head assemblies comprises a carriage adapted for travel along said way, a pair of gripping jaws pivotally supported on said carriage and power means for selectively opening and closing said jaws whereby said jaws are pivotable between an open position wherein a mandrel may be placed therebetween and removed therefrom, and a closed position wherein said jaws surround and engage a sleeve disposed on said mandrel.

5. Apparatus as defined in claim 4 including a pneumatic cylinder for operating said jaws.

6. Apparatus as defined in claim 4 wherein said means defining a way comprises a horizontal rail and wherein said carriage comprises rollers adapted to travel along said rail.

7. Apparatus as defined in claim 4 wherein the inward side faces of said jaws have magnetic means mounted thereon adapted to engage and hold the adjacent end portion of said forming member.

8. Apparatus as defined in claim 1 wherein said mandrel has an outer diameter of between 2½ and 8 inches.

9. Apparatus as defined in claim 1 wherein said inner edges of said forming member are helical.

10. Apparatus as defined in claim 1 wherein said inner edges of said forming member are annular.

* * * * *